United States Patent
Rinearson et al.

(10) Patent No.: US 7,953,736 B2
(45) Date of Patent: May 31, 2011

(54) RELEVANCY RATING OF TAGS

(75) Inventors: Peter Rinearson, Vashon, WA (US); Erik Speckman, Seattle, WA (US)

(73) Assignee: Intersect PTP, Inc., Seattle, WA (US)

( * ) Notice: Subject to any disclaimer, the term of this patent is extended or adjusted under 35 U.S.C. 154(b) by 344 days.

(21) Appl. No.: 11/969,407

(22) Filed: Jan. 4, 2008

(65) Prior Publication Data

US 2008/0168055 A1 Jul. 10, 2008

Related U.S. Application Data (60) Provisional application No. 60/883,506, filed on Jan. 4, 2007.

(51) Int. Cl.
*G06F 17/30* (2006.01)

(52) U.S. Cl. ........................................ 707/736

(58) Field of Classification Search ................ 707/3, 5, 707/200, 736; 715/513
See application file for complete search history.

(56) References Cited

U.S. PATENT DOCUMENTS

| | | | |
|---|---|---|---|
| 6,360,215 B1 | 3/2002 | Judd | |
| 6,397,219 B2 | 5/2002 | Mills | |
| 6,405,226 B1 | 6/2002 | Alpert | |
| 6,658,377 B1 | 12/2003 | Anward | |
| 6,823,333 B2 | 11/2004 | McGreevy | |
| 6,961,724 B1 | 11/2005 | Kindo | |
| 7,032,178 B1 | 4/2006 | McKnight | |
| 7,143,084 B1 | 11/2006 | Rinearson | |
| 7,548,914 B2 * | 6/2009 | Bell et al. ........................ | 1/1 |
| 7,668,857 B2 * | 2/2010 | Cook et al. ...................... | 709/242 |
| 2002/0073079 A1 | 6/2002 | Terheggen | |
| 2003/0122839 A1 | 7/2003 | Matraszek | |
| 2004/0006740 A1 * | 1/2004 | Krohn et al. ................... | 715/513 |
| 2005/0240608 A1 | 10/2005 | Jones | |
| 2005/0256867 A1 | 11/2005 | Walther et al. | |
| 2006/0107297 A1 | 5/2006 | Toyama | |
| 2006/0242661 A1 | 10/2006 | Bodlaender | |
| 2006/0256382 A1 | 11/2006 | Matraszek | |
| 2006/0271524 A1 | 11/2006 | Tanne | |
| 2006/0288041 A1 | 12/2006 | Plastina | |
| 2006/0294086 A1 | 12/2006 | Rose et al. | |

(Continued)

OTHER PUBLICATIONS

Terdiman, Daniel, "Amazon tries its hand at tagging," C|Net News Blog, Nov. 15, 2005, C|Net news.com, http://www.news.com/8301-10784_3-5953622-7.html, Jan. 3, 2008.

(Continued)

*Primary Examiner* — Etienne P LeRoux (74) *Attorney, Agent, or Firm* — Kory D. Christensen; Stoel Rives LLP (57) ABSTRACT

A content item may be associated with metadata comprising one or more tags. A user may indicate a relevance rating associated with a tag. The relevance rating may indicate whether the user feels the tag is relevant to a particular content item. Using a plurality of user-provided relevance ratings, a tag relevance model may be established. A tag relevance model may comprise a weighted or un-weighted average and/or median relevance rating of the tag and/or a consistency of the relevance rating. The tag relevance model may be used to order or otherwise inform search results. Tag ratings may also be used to aggregate users into groups comprising users having a similar point of view relative to one or more tag ratings. In addition, users may be grouped according to content access and/or tags rated regardless of the relevance rating applied.

10 Claims, 7 Drawing Sheets

U.S. PATENT DOCUMENTS

| | | | |
|---|---|---|---|
| 2007/0100898 A1* | 5/2007 | Petras et al. | 707/200 |
| 2008/0065995 A1* | 3/2008 | Bell et al. | 715/751 |
| 2008/0091549 A1* | 4/2008 | Chang et al. | 705/26 |
| 2008/0140616 A1* | 6/2008 | Encina et al. | 707/3 |
| 2008/0155465 A1* | 6/2008 | Fu et al. | 715/803 |

OTHER PUBLICATIONS

Weiss-Lijn, Mischa and McDonnell, Janet T., "A 'Best Case' Evaluation of a Novel Information Retrieval Application," Eighth European Conference on Information Technology Evaluation, A Brown D Remenyi, Academic Conferences Limited, 2001, pp. 89-97.

Arrington, Michael, "Amazon Tags," TechCrunch, Nov. 14, 2005, TechCrunch.com, http://www.techcrunch.com/2005/11/14/amazon-tags/, Jan. 4, 2008.

MacManus, Richard, "Amazon Does Tagging," Read Write Web, Nov. 14, 2005, ReadWriteWeb.com, http://www.readwriteweb.com/archives/amazon_does_tag.php, Jan. 4, 2008.

* cited by examiner

RELEVANCY RATING OF TAGS

RELATED APPLICATIONS

This application claims priority to U.S. Provisional Application No. 60/883,506 entitled RELEVANCY RATING OF TAGS filed on Jan. 4, 2007, which is hereby incorporated by reference in its entirety.

TECHNICAL FIELD

This application relates generally to systems and methods for rating various aspects of tags associated with content and, more particularly, to systems and methods for providing relevancy ratings to such tags.

DETAILED DESCRIPTION OF PREFERRED EMBODIMENTS

Figure 1:
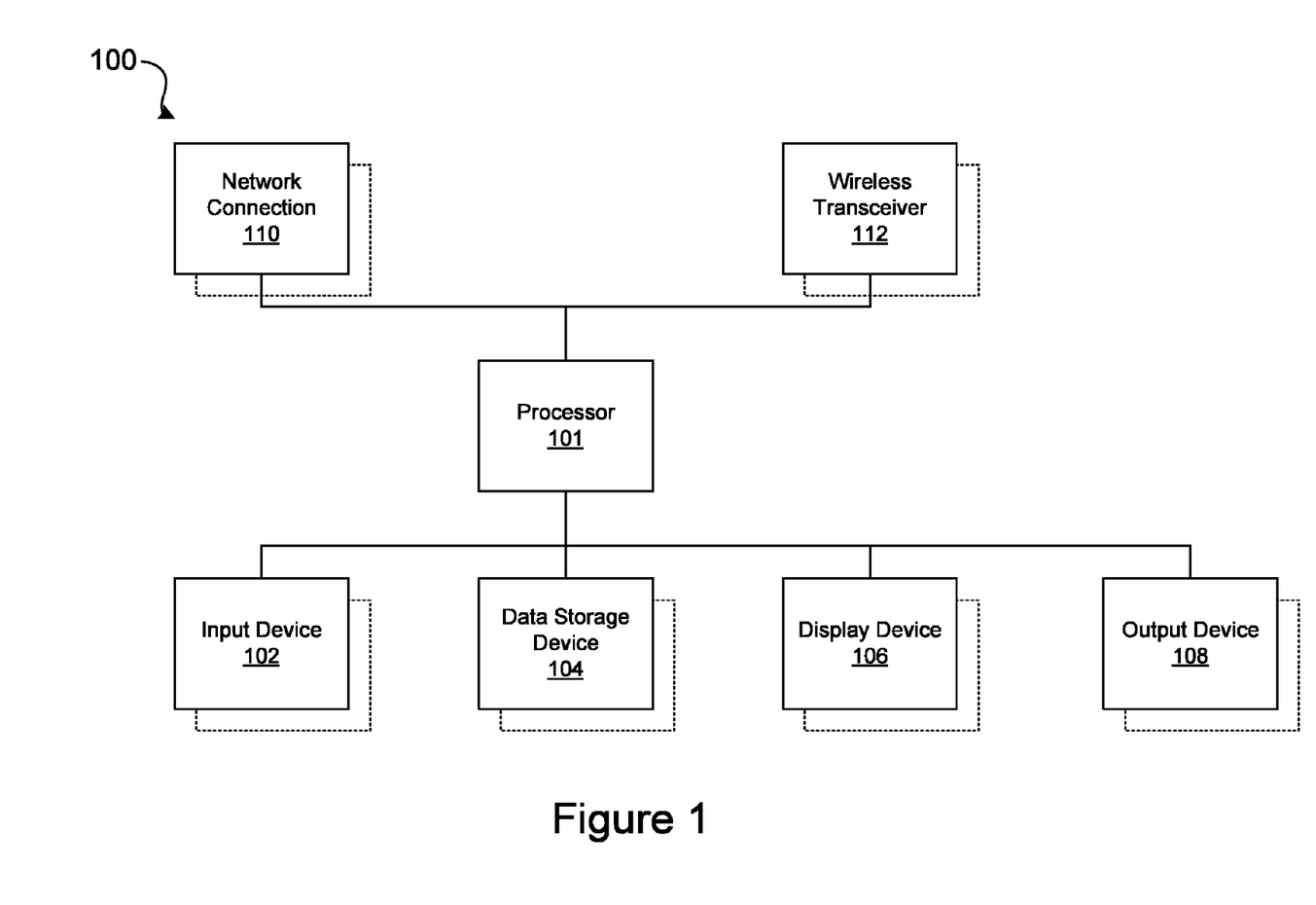
FIG. 1 is a block diagram of a basic and suitable computer that may employ aspects of the invention.

The embodiments of the disclosure will be best understood by reference to the drawings, wherein like elements are designated by like numerals throughout. FIG. 1 and the following discussion provide a brief, general description of a suitable computing environment in which aspects of the invention can be implemented. Although not required, aspects and embodiments of the invention will be described in the general context of computer-executable instructions, such as routines executed by a general-purpose computer, e.g., a server or personal computer. Those skilled in the relevant art will appreciate that the teachings of this disclosure could be practiced with other computer system configurations, including Internet appliances, hand-held devices, wearable computers, cellular or mobile phones, multi-processor systems, microprocessor-based or programmable consumer electronics, set-top boxes, network PCs, mini-computers, mainframe computers and the like. The teachings of this disclosure may be embodied in a special purpose computer or data processor that is specifically programmed, configured or constructed to perform one or more of the computer-executable instructions explained in detail below. Indeed, the term "computer," as used generally herein, refers to any of the above devices, as well as any data processor or any device capable of communicating with a network, including consumer electronic goods such as game devices, cameras, or other electronic devices having a processor and other components, e.g., network communication circuitry, whether such circuitry is electronic or organic, and whether it has been deliberately designed by humans or machines or whether it has been evolved.

The teachings of this disclosure may also be practiced in distributed computing environments, where tasks or modules are performed by remote processing devices, which are linked through a communications network, such as a Local Area Network ("LAN"), Wide Area Network ("WAN") or the Internet. In a distributed computing environment, program modules or sub-routines may be located in both local and remote memory storage devices. Aspects of this disclosure described below may be stored or distributed on computer-readable media, including magnetic and optically readable and removable computer discs, stored as firmware in chips (e.g., EEPROM chips), as well as distributed electronically over the Internet or over other networks (including wireless networks). Those skilled in the relevant art will recognize that portions of the disclosure may reside on a server computer, while corresponding portions reside on a client computer. Data structures and transmission of data particular to aspects of the disclosure are also encompassed within the scope of this disclosure.

Turning now to FIG. 1, one embodiment of a system for rating the relevancy of tags associated with content may employ a computer 100, such as a personal computer or workstation, having one or more processors 101 coupled to one or more user input devices 102 and data storage devices 104. The computer is also coupled to at least one output device, such as a display device 106 and one or more optional additional output devices 108 (e.g., printer, plotter, speakers, tactile or olfactory output devices, etc.). The computer may be coupled to external computers, such as via an optional network connection 110, a wireless transceiver 112, or both.

The input devices 102 may include a keyboard and/or a pointing device, such as a mouse. Other input devices are possible, such as a microphone, joystick, pen, game pad, scanner, digital camera, video camera, and the like. The data storage devices 104 may include any type of computer-readable media that can store data accessible by the computer 100, such as magnetic hard and floppy disk drives, optical disk drives, magnetic cassettes, tape drives, flash memory cards, digital video disks (DVDs), RAMs, ROMs, smart cards, etc. Indeed, any medium for storing or transmitting computer-readable instructions and data may be employed, including a connection port to or node on a network, such as a local area network (LAN), wide area network (WAN) or the Internet (not shown in FIG. 1).

Figure 2:
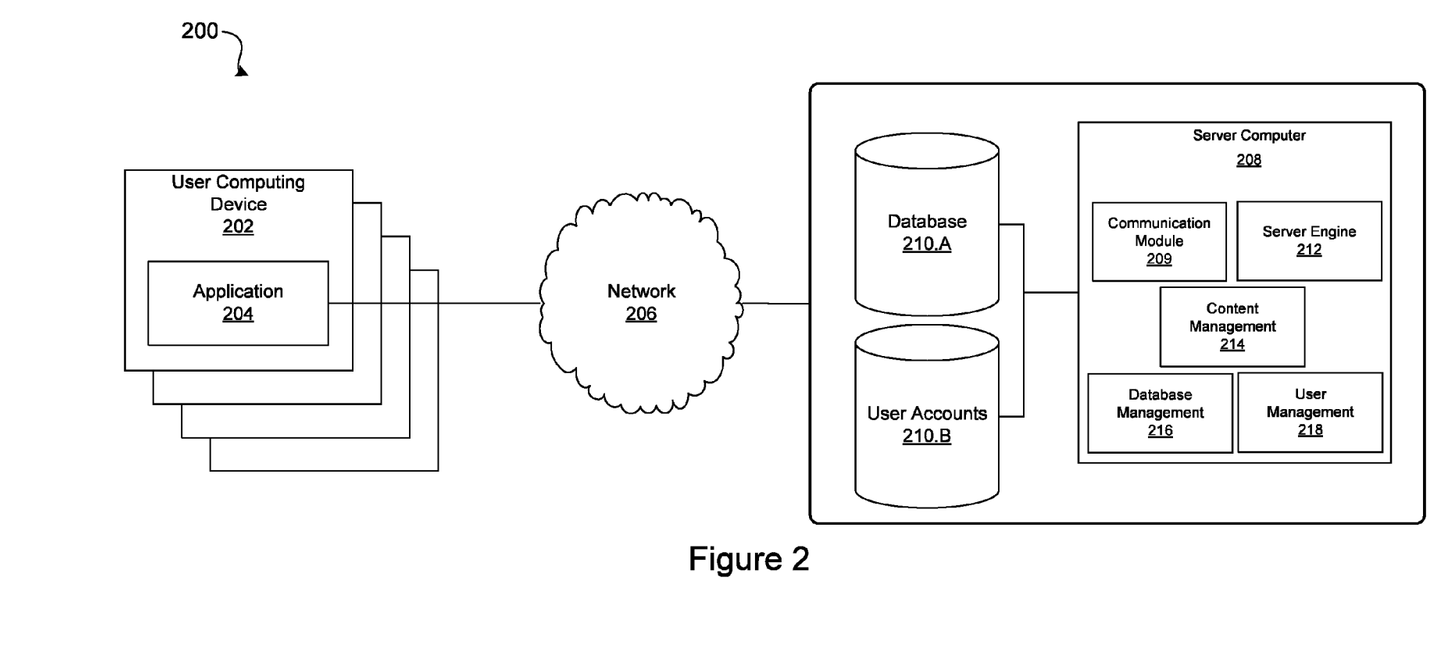
FIG. 2 is a block diagram illustrating a computing environment comprising a server communicatively coupled to one or more user computing devices.

Aspects of the teachings of this disclosure may be practiced in a variety of other computing environments. FIG. 2 depicts a distributed networking environment 200. Turning now to FIG. 2, a distributed computing environment comprising one or more user computing devices 202 communicatively coupled to a server computer 208 is depicted. In FIG. 2, one or more of user computing devices 202 may comprise an application program 204 which may be used to access and/or exchange data with other computing devices on the network. As such, application program 204 may comprise a web browser, such as Microsoft™ Internet Explorer™, Mozilla™ Firefox™, and/or Opera™. Alternatively, application 204 may be a media player and/or content presentation device, such as Adobe™ Creative Suite™, Microsoft™ Windows Media Player™, Winamp™, or the like. Applications 204 may comprise a network interface component to allow the application 204 to access content over network 206. For example, Adobe™ Creative Suite™ may provide access to a stock photo repository to allow users to purchase content for integration into an Adobe™ project; a media player, such as Microsoft™ Windows Media Player™, may provide access to an online music store to allow a user to purchase audio content therefrom; and a web browser may provide access to web accessible content on network 206.

Application 204 may allow a user to access web sites or other content accessible via a Transmission Control Protocol (TCP) Internet Protocol (IP) network (i.e., a TCP/IP network). One such network is the World Wide Web or Internet. One skilled in the art, however, would recognize that the teachings of this disclosure could be practiced using any networking protocol and/or infrastructure. As such, this disclosure should not be read as limited to a TCP/IP network, the Internet, or any other particular networking protocol and/or infrastructure.

User computing devices 202 may be substantially similar to the computer described above in conjunction with FIG. 1. As such, user computing devices 202 may comprise other program modules, such as an operating system, one or more application programs (e.g., word processing or spread sheet applications), and the like. The user computing devices 202 may be general-purpose and/or specific-purpose devices that may be programmed to run various types of applications, or they may be single-purpose devices optimized or limited to a particular function or class of functions. Alternatively, user computing devices 202 may comprise a portable computing device, such as a cellular telephone, personal digital assistant (PDA), smart phone, portable media player (e.g., Apple™ iPod™), multimedia jukebox device, or the like. As such, this disclosure should not be read as limited to any particular user computing device 202 implementation and/or device interface. Accordingly, although several embodiments herein are described in conjunction with a web browser application 204, the use of a web browser application 204 and a web browser interface are only used as a familiar example. As such, this disclosure should not be read as limited to any particular application 204 and/or interface.

System 200 may comprise a server computer 208 communicatively coupled to network 206. Network 206 may comprise routing, addressing, and storage services to allow computing devices, such as user computing devices 202 and server computer 208 to transmit and receive data, such as web pages, text content, audio content, video content, graphic content, and/or multimedia content therebetween. Network 206 may comprise a private network and/or a virtual private network (VPN). Network 206 may comprise a client-server architecture, in which a computer, such as server 208, is dedicated to serving other client user computing devices 202, or it may have other architectures such as a peer-to-peer, in which one or more user computing devices 202 serve simultaneously as servers and clients. In addition, although FIG. 2 depicts a single server computer 208, one skilled in the art would recognize that multiple server computers 208 could be deployed under the teachings of this disclosure (e.g., in a clustering and/or load sharing configuration). As such, this disclosure should not be read as limited to a single server computer 208.

Server 208 may be communicatively coupled to network 206 by communication module 209. Communication module 209 may comprise a wired and/or wireless network 206 interface capable of communicating using a networking and/or communication protocol supported by network 206 and/or user computing devices 202.

Server 208 may comprise and/or be communicatively coupled to a data storage module 210.A. Data storage module 210.A may comprise one or more databases, XML data stores, file systems, X.509 directories, LDAP directories, and/or any other data storage and/or retrieval systems known in the art. Data storage module 210, A may comprise web pages and associated content to be transmitted to one or more of user computing devices 202 over network 206.

Server computer 208 may comprise server engine 212, content page management component 214, and data storage management module 216. Server engine 212 may perform processing and operating system level tasks including, but not limited to: managing memory access and/or persistent storage systems of server computer 208, managing connections to user computer(s) 202 over network 206, and the like. Server engine 212 may manage connections to/from user computing devices 202 using communication module 211.

Content management module 214 may create, display, and/or otherwise provide content to user computer(s) 202 over network 206. In addition, and as will be discussed below, content management component 214 may manage metadata (including tag metadata) associated with content displayed or otherwise provided to user computing devices 202. Data storage management module 216 may be configured to interface with data storage module 210.A to store, retrieve, and otherwise manage data in data storage module 210.A.

In one embodiment, server engine 212 may be configured to provide data to user computer(s) 202 according to the Hypertext Transfer Protocol (HTTP) and/or secure HTTP (HTTPS). As such, server computer 208 may provide web page content to user computer(s) 202. Although server computer 208 is described as providing data according to the HTTP and/or HTTPS standards, one skilled in the art would recognize that any data transfer protocol and/or standard could be used under the teachings of this disclosure. As such, this disclosure should not be read as limited to any particular data transfer and/or data presentation standard and/or protocol.

User computing devices 202 may access content stored on data storage module 210.A and made available by content management module 214 via a uniform resource Identifier (URI) addressing server computer 208. The URI may be formed according to RFC 1630, 1738, 2396, 2732 and/or 3986 and may comprise a domain name indicator (e.g., www.example.com) which may be resolved by a domain name server (DNS) (not shown) in network 206 into an Internet Protocol (IP) address. This IP address may allow user computer(s) 202 to address and/or route content requests through network 206 to server computer 208. The URI may further comprise a resource identifier to identify a particular content item on server computer 208 (e.g., content.html).

Responsive to receiving a URI request, server engine 212 may be configured to provide the content to a user computing device 202 comprising the content (e.g., web page) identified in the URI. Content management module 214 and data storage management module 216 may be configured to obtain and/or format the requested content to be transmitted to a user computing device 202 by server engine 212.

Server computer 208 may comprise a user management module 218. User management module 218 may access user account data store 210.B. User accounts data store 210.B may comprise one or more user accounts relating to one or more users authorized to access content on server computer 208. User account data 210.B may comprise a user name of the user, a user password, content accessed by the user, authorizations granted to the user, or the like.

Server computer 208, data storage module 210.A, and user accounts module 210.B may comprise security measures to inhibit malicious attacks thereon, and to preserve integrity of the messages and data stored therein. Such measures may include, but are not limited to: firewall systems, secure socket layer (SSL) communication, user authentication, public key infrastructure (PKI) authentication, password protection schemes, data encryption, and the like.

Figure 3:
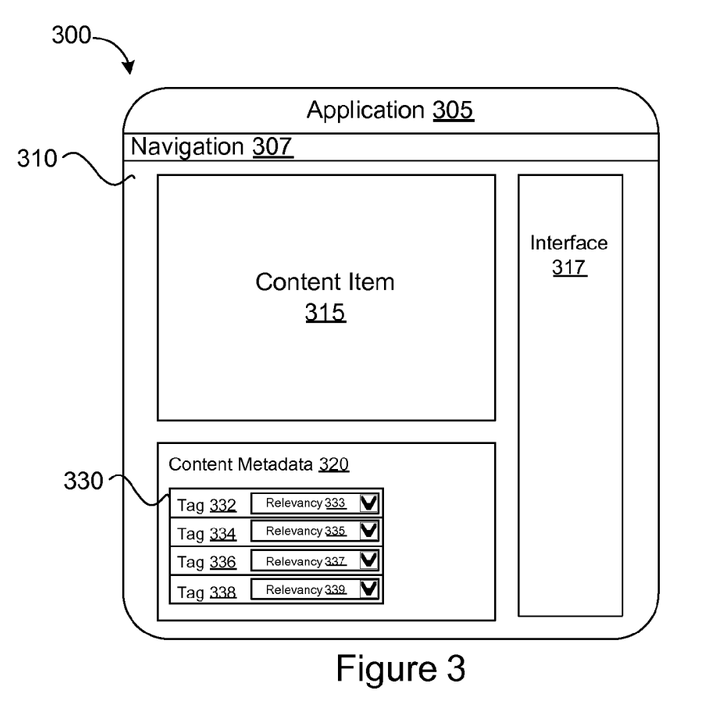
FIG. 3 is a depiction of one embodiment of an application presenting a content item and one or more tags associated with the content item.

Turning now to FIG. 3, one embodiment 300 of content provided by a content provider, such as server computer 208 of FIG. 2, is depicted. In FIG. 3, application 305 may comprise web browser software, such as Microsoft™ Internet Explorer™, Mozilla Firefox™, or Opera™. Application 305 may be configured to display content formatted according to an HTML, Extensible Markup Language (XML), and/or related standard. Application 305 may comprise navigation component 307 which may be used to enter a URI to access a web site (e.g., server computer 208 of FIG. 2) and/or to navigate within a web site.

Application 305 may comprise a display 310 wherein HTML data may be rendered for presentation to a user. A content item 315 may be presented in display 310. Content item 315 may include, but is not limited to: an image, an illustration, a drawing, pointer (e.g., a link, URI, or the like), video content, Adobe™ Flash™ content, audio content (e.g., a podcast, music, or the like), text content, a game, downloadable content, a collection and/or arrangement of content items, or the like.

Display 310 may comprise interface 317. Interface 317 may provide browsing and/or searching functionality to access content on the web site. As such, interface 317 may comprise a search component (not shown) to allow a user to search for a content item 315 using one or more search terms, keywords, and/or tag. A search module of the web site and/or external search service may compare the one or more search terms to, inter alia, content metadata to determine a match.

As used herein, metadata may refer to a word or short phrase used to: describe content (e.g., an image, video, or the like); an aspect or characteristic of the content; or the like. Accordingly, metadata 320 may be used to describe a content item 315 displayed on display 310 (e.g., an image, video content, etc.).

Metadata 320 may be displayed in connection with content item 315 (e.g., in the same display 310 as content item 315) and may comprise tag metadata 330. Tag metadata 330 may comprise text descriptors associated with content item 315 to describe and/or categorize content item 315. For example, content item 315 may be a graphical depiction (e.g., digital photograph) of an object, or it may be text, audio, video, animation, or even metadata. Tag metadata 330 may be used to describe the subject matter of the content (whether image or otherwise), an image location, an emotion invoked by the image, a compositional style of the image, or the like. For instance, content item 315 may comprise a photograph of a salmon in a river. In this case, tag 332 may be "salmon" identifying the subject matter of the photograph; tag 334 may identify the river where the photo was taken (e.g., "Skeena River"); tag 336 may identify a prominent feature of the photograph (e.g., "river"); and tag 338 may indicate an aesthetic appeal of the photograph (e.g., "nature") or a color that is prominent in the photograph (e.g. "pink"). Although FIG. 3 depicts four (4) tags 330 in metadata 320, any number of tags may be associated with content 315.

Each tag 332, 334, 336, and 338 may comprise and/or be associated with a user interface component 333, 335, 337, and 339 that may be used to allow a user, whether paid or unpaid, expert or amateur, to rate a relevancy of the tag 332, 334, 336, and 338 to content item 315. Interface components 333, 335, 337, and 339 may comprise a combo box, list selector, a slider, a text entry box, or the like. Interface components 333, 335, 337, and 339 may allow a user to select one of a set of relevancy ratings to be assigned to a particular tag. For example, a combo box control may comprise text entries to rate the relevancy of a tag, such as: 1) "high," "moderate," and "low"; 2) "totally," "considerably," "somewhat," "a bit," ""not sure"; 3) "strong," "reasonable," "modest," "Irrelevant"; (4) "0," "1," "2," "3"; or the like. A user may rate a tag as having a "high" relevance if the user feels that the tag is highly relevant to the content item 315. For example, a user may feel that a "salmon" tag 332 is highly relevant to a photograph 315 of a salmon in a river. As such, the user may select a "high" entry on interface component 333. The user may feel that "river" is a poor descriptor of the content item 315 and, as such, the user may select "moderate" or "low" in interface component 335, and so on. Alternatively, the user may be allowed to enter a numeric rating of the relevancy of the tag (e.g., 10 for highly relevant and 0 for least relevant, etc.) using text entry and/or a control such as a slider control, dial, or arrow. The user may also indicate merely that the tag is or is not relevant, using a control that registers the states of "relevant" and "irrelevant," where the choices may be such as "yes" and "no," "thumbs-up" and "thumbs-down," a box that is checked only if the tag is deemed relevant or helpful, a button that is clicked to indicate relevance or affirmation, or the like.

User-provided tag relevancy ratings may be stored and/or associated with tag metadata 330. In this way, the user-provided relevancy ratings themselves may comprise metadata. The tag relevancy ratings may be used to determine, on a consensus or weighted basis, a relevancy of a particular tag. The composite relevancy ratings of a tag may be referred to as a "relevance model" of the tag. The relevance model of a tag may comprise an average and/or median relevancy rating of the tag, a consistency factor of the rating (e.g., relevancy rating deviation), the number of user ratings submitted for the tag, and the like. Changes in the relevance model (ratings) measured over time may themselves be recorded as metadata.

The relevance model of a tag may be used to refine search results and/or to provide search functionality (e.g., strongly associating relevant tags with the content item), and the like. In one embodiment, the relevance model of a tag may be used to order search results. For example, if a user were to enter a search term into interface 317 (e.g., "salmon") content items having the tag may be returned. These results may be ordered based upon the relative relevance factor and/or model associated with the tag. For example, a content item having a "salmon" tag with an average and/or mean of "high" may be ordered before a content item where the "salmon" tag is "low." Where multiple search terms are used, a composite (and/or weighted) tag/relevancy score may be determined and used to order the search results.

A consistency level associated with the tag relevance model (e.g., the deviation) may be used to order search results. For example, users may be interested in tags having widely varying ratings. A rating having a wide divergence in relevance rating may be indicative of a controversial and/or esoteric tag that different users may view differently. A user may wish to order a search results based on the divergence of a particular tag's relevance rating.

User-provided ratings may also provide information about the user submitting the tag relevancy ratings. For instance, users may be grouped together based upon correlation between relevancy ratings for specific tags. If both users consider a particular tag (e.g., "nature," "beautiful," etc.) to be relevant to a particular content item, the users may be grouped together as having a similar aesthetic sense and/or taste, or this information about the users may be used as a basis for an opinion about the quality of the user's tastes, regardless of whether or not such opinion is explicitly expressed. As such, a user profile may be generated using upon one or more tag relevance ratings by the user Even where the users' relevancy ratings differ, certain users may be grouped together based upon the content they access and rate. For instance, although the users' tag relevancy ratings differ, the certain users may submit ratings for a common set of content items. As such, even though the users' tag ratings may differ, the users may be grouped together as having a common interest in a particular type and/or style of content.

Figure 4:
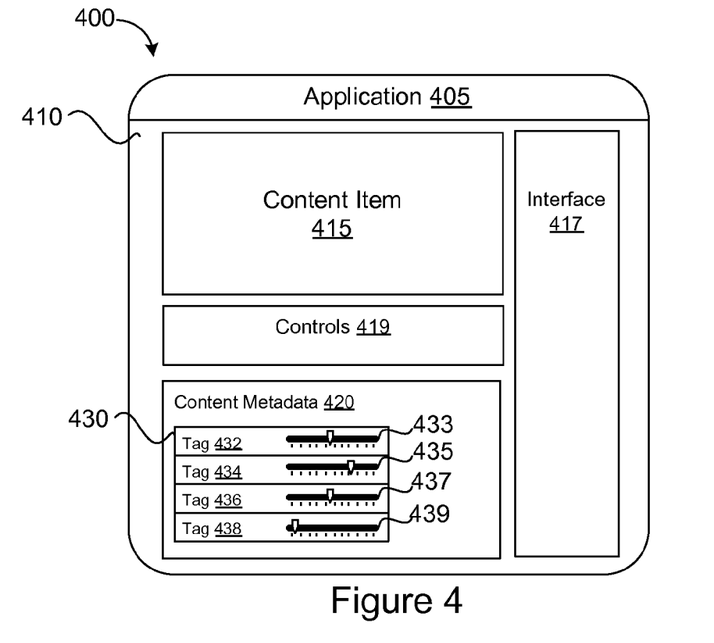
FIG. 4 is a depiction of one embodiment of an application presenting a content item and one or more tags associated with the content item.

Turning now to FIG. 4, one embodiment 400 of an application in communication with a server computer, such as server computer 208 of FIG. 2, is depicted. In FIG. 4, application 405 may comprise media player software, such as Microsoft™ Windows Media Player™, Winamp™, a Flash™ player, or the like.

Application 405 may comprise a display on which a content item 415 may be presented. Content item 415 may comprise video, audio, graphic, and/or multimedia content. Display 410 may comprise an interface 417 to allow a user of application 405 to access various content items 415. As such, interface 417 may comprise a playlist browser or the like. Interface 417 may further comprise controls 419. Controls 419 may allow a user to interact with content item 415 and/or control the playback of content item 415 (e.g., play, pause, fast forward, etc.).

As discussed above, content item 415 may comprise metadata 420 associated therewith. Metadata 420 may comprise tag metadata 430, and may be displayed in connection with content item 415 on display 410. Tag metadata 430 may comprise one or more tags describing one or more aspects of content item 415. For example, if content item 415 comprises video content (e.g., a movie), tags 430 may comprise indications of the genre, style, and/or plot elements of the content, such as "action," "romance," and the like. Tags 430 may describe the genre of the content, such as "film noire," "teen," "situational comedy," or the like. Tags 430 may also describe a location and/or focus of the content, such as "Yellowstone" (for a documentary on Yellowstone National Park), "Wyoming," or the like. As discussed above, tags 430 may comprise any number of tags 432, 434, 446, and 448 and may refer to any aspect of content item 415.

Each tag 432, 434, 436, and 436 may comprise and/or be associated with a relevancy rating input 433, 435, 437, and 439 which may be embodied as a slider control. Slider controls 433, 435, 437, and 439 may be used to indicate a relevancy of the tag to content item 415. For example, slider controls 433 and 437 may indicate that tags 432 and 436 are of moderate relevance to content item 415. Slider control 437 may indicate that tag 438 is highly relevant to content item 415 and slider control 435 may indicate that tag 434 is a low relevance to content item 415.

In the FIG. 4 embodiment, content item 415 may be stored on the user's computer. As such, application 405 may not access a server (e.g., server 208 of FIG. 2) in order to access content item 415. Metadata 430 associated with content, however, may be obtained from a server over a network. As such, even where content item 415 is stored locally, metadata 430 may represent tags and associated relevance ratings provided by one or more members of a user community. In this embodiment, when a user submits one or more tag relevancy ratings using interface components 433, 435, 437, and/or 439, the ratings may be transmitted to the metadata provider to further refine metadata 430 and/or provide information about the user submitting the relevancy ratings.

Figure 5:
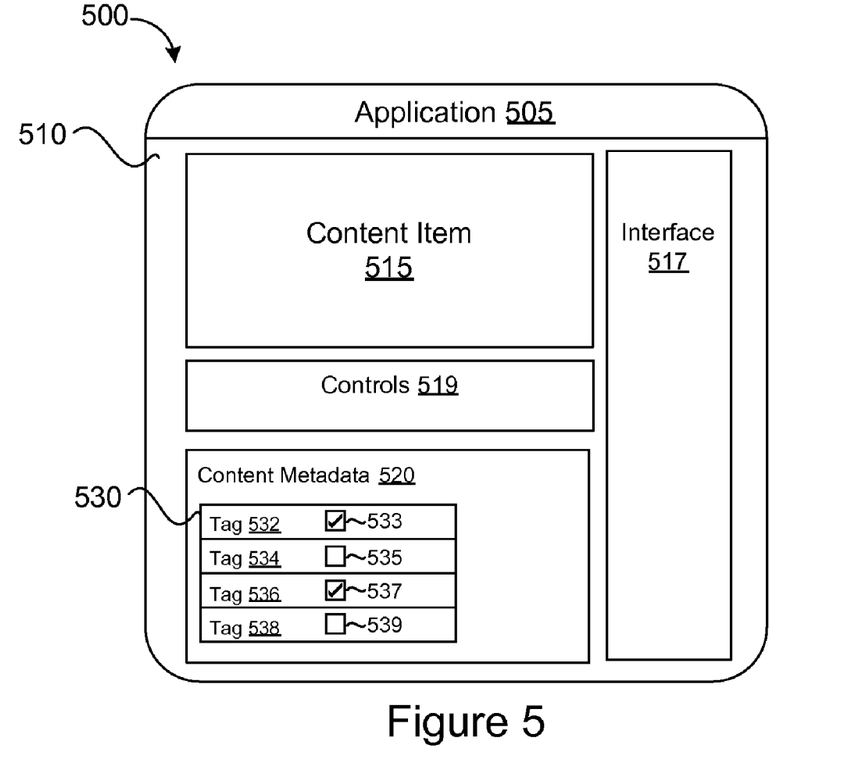
FIG. 5 is a depiction of one embodiment of an application presenting a content item and a tags associated with the content item.

Turning now to FIG. 5, one embodiment 500 of an application in communication with a server computer, such as server computer 208 of FIG. 2, is depicted.

Application 505 may comprise a display on which a content item 515 may be presented. Display 510 may further comprise an interface 517 to allow a user of application 505 to access various content items 515. As such, interface 517 may comprise a playlist browser, a navigation component, or the like. Display 510 may comprise controls 519, which may allow a user to interact with content item 515 and/or control the playback of content item 515 (e.g., play, pause, fast forward, etc.).

Display 510 may comprise metadata 520 displayed in connection with content item 515. Metadata 520 may comprise one or more metadata tags 532, 534, 536, 538 in a metadata tag list 530. As discussed above, metadata tags 532, 534, 536, and 538, may be used to describe content item 515. Each tag 532, 534, 536, and 538 may be associated with a corresponding checkbox input 533, 535, 537, and 539. Selecting checkbox input 533, 535, 537, and/or 539 may indicate that a user feels that the associated tag 532, 534, 536, and/or 538 is relevant to content item 515. The relevance of a tag may be determined by the number of users who select the corresponding tag input 533, 535, 537, and/or 539. In an alternative embodiment, checkboxes 533, 535, 537 and/or 539 may comprise a ranking input (e.g., a text selection box) to allow users to rank tags 532, 534, 536 and/or 538 in order of relevance to content item 515.

Figure 6:
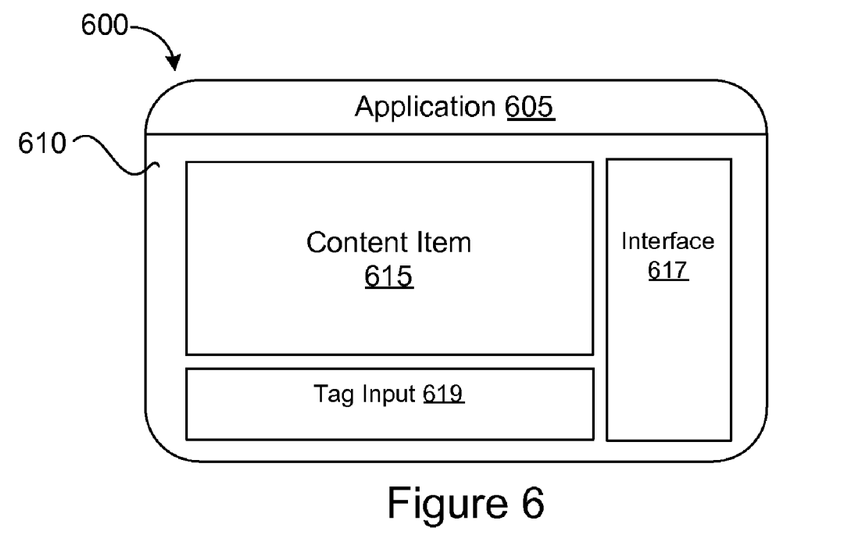
FIG. 6 is a depiction of one embodiment of an application presenting a content item and an input whereby a user may submit a tag corresponding to the content item.

Turning now to FIG. 6, one embodiment 600 of content item 615 displayed in an application 605 is depicted. In FIG. 6, application 605 may comprise web browser software in communication with a server.

Application 605 may comprise a display 610 wherein a content item 615 may be presented. As discussed above, content item 615 may include, but is not limited to: an image, video content, audio content, Flash™ content, text, interactive content, downloadable content, or the like.

Display 610 may comprise interface 617, which may provide browse and/or search functionality to access various content items 615 using application 605. Display 610 may further comprise a tag input component 619. Tag input component 619 may comprise any input component known in the art including, but not limited to a text entry field, an upload component, or the like to allow a user to provide a user-submitted metadata tag to associate with (e.g., describe) content item 615.

Relevant metadata tags may be determined based upon, inter alia, the frequency a particular tag is submitted. In one embodiment, one or more relevant tags may be identified by simply counting the number of times each tag is submitted. For example, if content item 615 were to comprise a photograph of a salmon, a large number of users may submit a "salmon" tag via tag input component 619. As such, the "salmon" tag may be considered to be highly-relevant to content item 615. Tags submitted relatively infrequently (i.e., by a relatively few number of users) may be considered to be less relevant. For instance, a relatively small number of users may submit a "cute" tag for the salmon photograph 615. As such, "cute" may be deemed to be less-relevant to content item 615.

As depicted in FIG. 6, in some embodiments, any existing metadata tags of content item 615 may not be displayed in 610. This may prevent a user submitting one or more tags via input component 619 from being influenced by others' opinions.

In one embodiment, the tags submitted by some users may be given greater weight than the tags submitted by other users. This weight may be determined by the users' past tag submissions (e.g., have submitted relevant tags in the past), an observed correlation between the users' submission and other highly weighted users' submissions, or the like.

Figure 7:
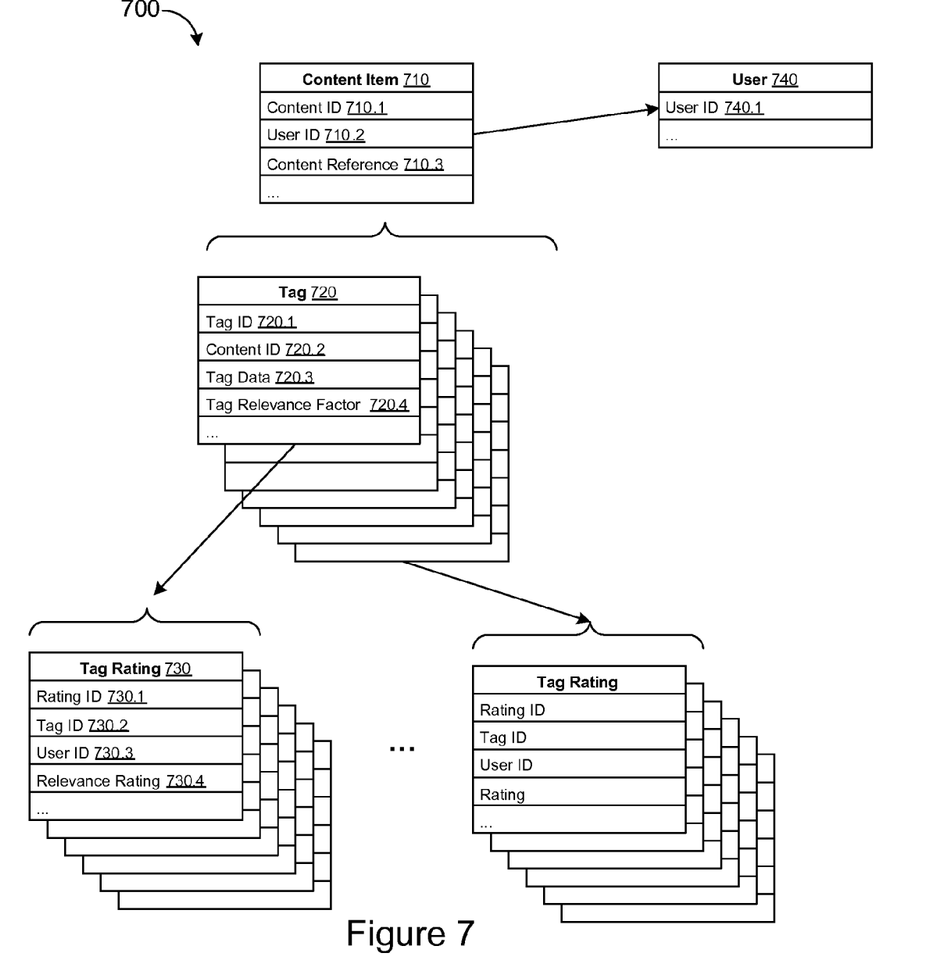
FIG. 7 is block diagram of one embodiment of a data structure schema for storing and maintaining tag relevancy rating data.

Turning now to FIG. 7, one embodiment of a data schema for storing and maintaining tag relevancy data is depicted. The data structures 700 depicted in FIG. 7 may correspond to data base schema tables that may be used in, for example, a Structured Query Language (SQL) database. Although a SQL style database schema is described and depicted in FIG. 7, one skilled in the art would recognize that the data structures and data associations depicted in FIG. 7 could be mapped to any data storage system and/or technique known in the art (e.g., X.509 and/or Lightweight Directory Access Protocol (LDAP) directory, XML, or the like). As such, the data structures of FIG. 7 should not be read as limited to any particular data storage and/or data management implementation.

Content table 710 may comprise a content identifier 710.1, user identifier 710.2, and a content reference 710.3. Content identifier 710.1 may comprise a locally and/or globally unique identifier (hereafter "identifier") that may be used to identify content 710. As such, content identifier 710.1 may comprise an SQL "primary key." User identifier 710.2 may identify the submitter of content 710 if such information is available and, as such, may comprise an SQL "foreign key." For example, if a particular content item 710 comprises a photograph submitted to a photography content site, user identifier 710.2 may identify the user who submitted the photograph. Content reference 710.3 may comprise a link and/or reference to the content item. As such, content reference 710.3 may comprise a foreign key pointing to another database table (not shown), a URI where the content may be obtained, data comprising the content item (e.g., SQL blob), or the like.

Each content item 710 may be associated with a plurality of tags 720. Tag 720 may represent tag metadata associated with a content item 710. Tag 720 may comprise a tag identifier 720.1 that may identify the tag. Content identifier 720.2 may identify the content item 710 tag 720 describes. Tag data 720.3 may comprise the tag data itself (e.g., tag describing content 710).

Tag relevance model 720.4 may comprise data representing a statistical or other model of one or more tag relevancy ratings (e.g., the average relevancy rating, rating deviation, etc.). One embodiment of a tag relevance model 720.4 is described in more detail below in conjunction with FIG. 8.

Each tag 720 entry may be associated with a plurality of tag ratings 730 each representing a user-submitted tag relevancy rating. Each tag rating 730 may comprise a rating identifier 730.1 to identify the rating 730 and a tag identifier 730.2, which may identify the subject (i.e., tag) of the tag rating 730. Additionally, tag rating 730 may comprise user identifier 730.3, which may be used to identify the user who submitted the tag rating 730.

Tag rating 730 may comprise a tag relevance rating 730.4, which may represent a relevance rating of tag 720. As discussed above, relevance rating 730.4 may comprise a textual, numerical, and/or Boolean value indicating whether the user 730.3 feels that the tag 720 (identified by tag identifier 730.2) is relevant to the content item 710 (identified by content identifier 720.2) associated with tag 720. As shown in FIG. 7, each tag 720 may comprise a plurality of tag ratings 730.

Figure 8:
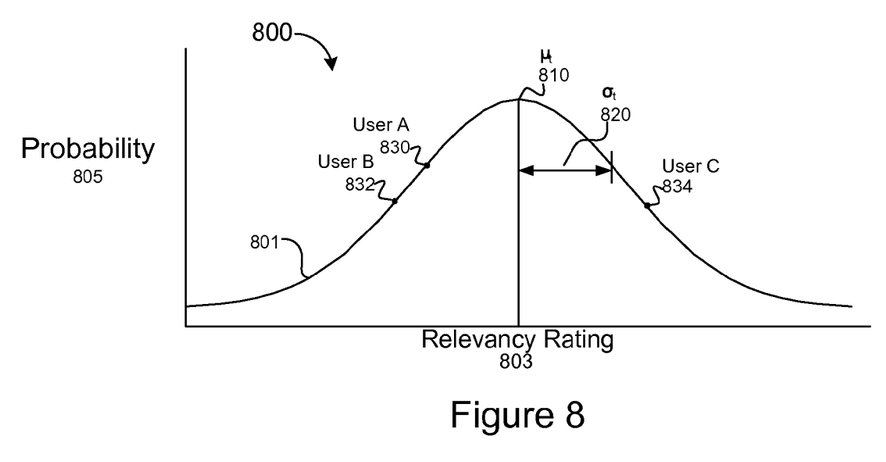
FIG. 8 is a graphical depiction of relevance model data associated with a tag comprising one or more user-provided relevancy ratings.

Turning now to FIG. 8, one embodiment of tag relevance model data is depicted. In one embodiment, tag relevance model 800 may comprise a statistical model of the user-provided tag relevancy ratings associated with a particular tag. As such, a tag relevance model may comprise a Normal (i.e., Gaussian) statistical model comprising a tag relevancy rating mean p (e.g., average relevancy rating) and deviation σ.

The mean μ rating relevance of a tag may be determined by assigning a numeric value to each relevancy rating, and calculating the mean per Equation 1.1:

$$\mu_t = \frac{1}{N}\sum_{i=1}^{N} R_1 \qquad \text{Eq. 1.1}$$

In equation 1.1, $\mu_t$ may represent the mean relevancy rating of a tag t, N may be the number of relevancy ratings associated with tag t, and $R_i$ may be a relevancy rating associated with tag t. In an alternative embodiment, the opinion of users in the user community may be weighted relative to one another. This relative weight may be referred to as a "rating weight" of a user. For instance, some users may be considered to have more experience, expertise, or the like in providing relevance ratings. As such, relevance ratings submitted by these users may be given greater weight relative to other users in the community. Alternatively, lesser weight may be given to new users or users who have provided inconsistent and/or inappropriate tag relevance ratings in the past or who in the past have submitted feedback for which there may be a perceived conflict of interest. One of skill in the art would recognize that Equation 1.1 and 1.2 (discussed below) could be modified to include such weights.

The deviation σ of a particular tag may be calculated per Equation 1.2:

$$\sigma_t = \sqrt{\frac{1}{N}\sum_{i=1}^{n} (R_i - \mu_t)^2} \qquad \text{Eq. 1.2}$$

In Equation 1.2, $\sigma_t$ may represent the standard deviation of a particular tag t, N may be the number of relevancy ratings associated with tag t, $R_i$ may be a relevancy rating associated with the tag t, and $\mu_t$ may be the tag mean calculated per Equation 1.1.

The mean and standard deviation may be derived from user submitted relevancy ratings using Equations 1.1 and 1.2. The relevant data may be obtained using data access techniques well known in the art. For example, where the data structures of FIG. 7 represent SQL database tables, the relevancy ratings of a tag t may be obtained by issuing a SQL query or the like (e.g., Select 'Rating' from 'Tag Rating 730' where tag ID='t'). As discussed above, the teachings of this disclosure could be practiced using any data access and/or data management technique known in the art. As such, this disclosure should not be read as limited to SQL database systems or any other particular data storage and/or retrieval system.

Although a Normal distribution is described herein, one skilled in the art would recognize that other statistical models could be used under the teachings of this disclosure including, but not limited, to: a Rayleigh distribution; chi-square distribution; Cauchy distribution; or the like. As such, this disclosure should not be read as limited to any particular statistical modeling tool and/or distribution. In addition, relevancy ratings may be modeled using other (e.g., non-statistical) modeling tools and/or techniques. As such, this disclosure should not be read as limited to any particular model type and/or modeling technique.

The mean tag relevancy rating $\mu_t$ may represent a "user community consensus" of the relevance of the tag t to its associated content. The standard deviation $\sigma_t$ value may indicate the cohesiveness (i.e., consistency) of the community consensus (i.e., mean). For example, a large standard deviation $\sigma_t$ may indicate that there is little consensus regarding the relevance of a particular tag (e.g., users may be split as to whether the tag is highly relevant or irrelevant). Conversely, a low standard deviation $\sigma_t$ value may indicate that there is strong community consensus regarding the relevance level assigned to the tag t.

The statistical modeling information described above may be used in various ways. For example, as discussed above, the relevance model data may be used to refine search results. A user may search for content using a particular keyword tag. The corresponding search results may be ordered based upon the average relevancy rating of the tag (i.e., $\mu_t$ of the tag) and may be further refined based upon the consistency of that consensus (i.e., $\sigma_t$ of the tag).

The relevance model of a tag may be used to identify tags that are effective at creating consensus among a community of users or creating divergence between members of the community. This information may be based upon, inter alia, a standard deviation $\sigma_t$ of the relevance model.

Upon determining the mean $\mu_t$ and standard deviation $\sigma_t$ of a particular tag t, a Normal probability density function of the tag t may be determined per Equation 1.3:

$$p(R) = \frac{1}{\sigma_t \sqrt{2\pi}} \exp\left(-\frac{(R - \mu_t)^2}{2\sigma_t^2}\right) \quad \text{Eq. 1.3}$$

In Equation 1.3, p(R) may represent the probability of a particular tag rating, $\sigma_t$ may be the mean of the tag, $\sigma_t$ may be the standard deviation associated with the tag t, and R may be a particular tag relevancy rating.

FIG. 8 depicts one embodiment of a probability distribution function p(R) of a plurality of relevancy ratings associated with a tag. Plot 800 may comprise a relevancy axis 801 and a probability axis 803 (i.e., p(R) per Equation 1.3). The relevancy ratings may have a mean $\mu_t$ 810 and standard deviation $\sigma_t$ 820 calculated per Equations 1.1 and 1.2 or derivations thereof.

Users may be classified depending upon how they rate a particular tag. For example, Users A and B 830 and 832 may rate tag t as less relevant than the tag relevance model mean $\mu_t$ 810 by substantially one standard deviation $\sigma_t$ 820. As such, User A 830 and user B 832 may be considered to have a similar view of the relevance tag t. In contrast, User C 834 may rate tag t has more relevant than mean $\mu_t$ 810. As such, User C 834 may be considered to have a dissimilar view of the relevance of tag t than Users A and B 830, 832.

By processing a sufficient quantity (i.e., plurality) of tag relevance models 800, similarities between users in a user community may be established and/or modeled using statistical, Bayesian, and/or pattern based modeling techniques. Moreover, similarities between users may be established based upon which tags, and associated content, the users have rated. This may provide insight into the types and/or genre of content the users prefer. These types of users may be grouped together or assigned descriptive metadata even if their relevancy views do not coincide. For example, a User A and User B may submit tag relevancy ratings for tags associated with a common set of content items. The common content items may create "cross-over" between users A and B.

Figure 9:
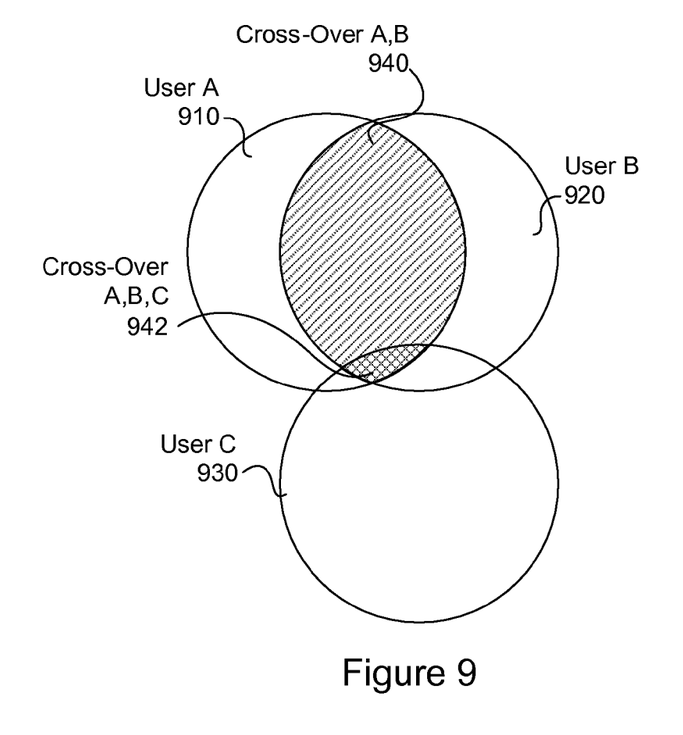
FIG. 9 is a graphical depiction of a cross-over region comprising content commonly accessed by one or more users.

Turning now to FIG. 9, a graphical depiction of a cross-over region between users rating the relevance of tags associated with one or more content items is depicted. In FIG. 9, Region 910 may represent the content items User A has accessed to submit a tag relevancy rating; region 920 may represent the content items User B has accessed to submit a tag relevancy rating; and region 930 may represent the content items User C has accessed to submit a tag relevancy rating. Cross-over region 940 may represent the content items jointly accessed by User A and User B. The cross-over between users A and B may be expressed as a percentage and/or ratio of the total content accessed by user A and/or B to the content jointly accessed by user A and/or B. This ratio may indicate the amount of cross-over between the users. For example, a cross-over ratio of one (1) may exist where users A and B rate tags associated with the same set of content items. As shown in FIG. 9, the cross-over between users A and B may be substantial (i.e., at or above 50%). As such, users A and B may be grouped based on this apparent interest in a common set of content item subject matter and/or tags corresponding to that subject matter. Cross-over between users A and B need not be substantial in order to be meaningful. For instance, even a single instance of cross-over between users may be sufficient to deduce meaning (e.g., a relationship between users). This relation may be made regardless of the actual tag relevancy rating submitted by users A and B. Alternatively, where there is a high-level of cross-over between users, combined with a high-degree rating consistency a stronger user grouping may be made. In contrast, FIG. 9 shows little cross-over 942 between region 930 of User C and either region 910 of User A or region 920 of User B.

User grouping information may be aggregated over time as more users submit tag relevancy ratings. As users submit relevancy ratings, grouping information may be compiled. For example, groups may be formed of users submitting tag ratings within a deviation $\sigma$ of one another (e.g., Users A and B may be grouped together if they rate tags similarly at least 80% of the time). Additionally, one or more groups may be formed of users submitting tag relevancy ratings for a similar set of content items (e.g., Users A and B may be grouped together if they have a content cross-over rate of 80% or higher as depicted in FIG. 9 above). One skilled in the art would recognize that any number of user groupings and/or grouping metrics could be employed under the teachings of this disclosure. As such, this disclosure should not be read as limited to any particular grouping mechanism.

Figure 10:
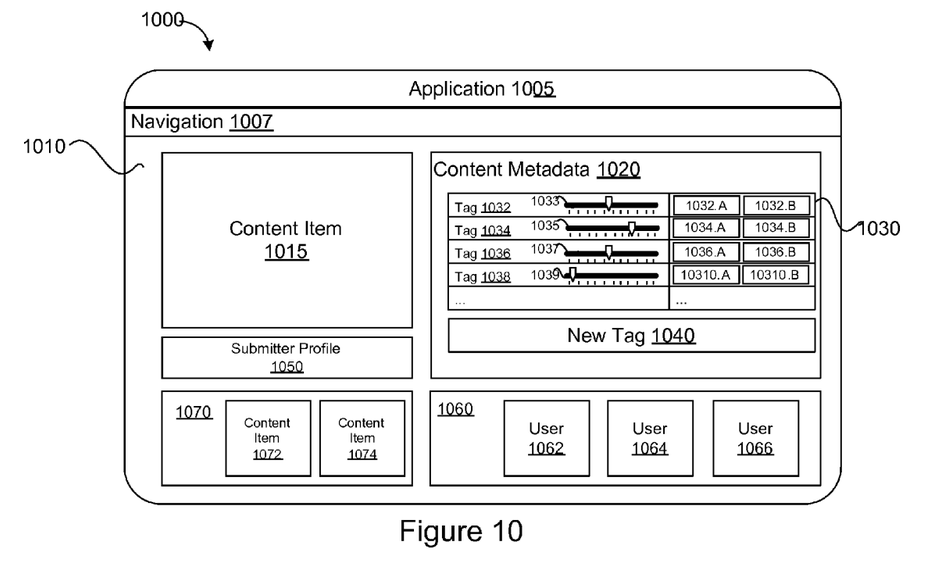
FIG. 10 is a depiction of one embodiment of an application presenting a content item, one or more tags associated with the content item, a user group list, and a content list.

Turning now to FIG. 10, one embodiment of a content item presentation interface comprising tag relevancy and user grouping information is depicted.

Application 1005 may comprise a navigation toolbar 1007 to allow a user to access a content item 1015 made available via a web interface. As such, application 1005 may comprise a web browser. Application 1005 may comprise a display 1010 where content item 1015 may be presented.

Content metadata 1020 may comprise one or more tags 1030 associated with content item 1015. Each tag entry 1032, 1034, 1036 and 1038 may comprise an input component (1033, 1035, 1037, and 1039, respectively) to allow a user to rate the relevancy of the corresponding tag. Additionally, tag relevance model data about each tag 1032, 1034, 1036, and 1038 may be provided. For example, 1032.A may indicate an average relevancy rating associated with tag 1032. This information may be conveyed as a number, text, a color, or the like. Alternatively, the relevancy information may be conveyed in the formatting and/or display of tag 1032. For instance, a highly relevant tag may be presented in a larger font and/or brighter color than a less relevant tag. Similarly, tags may be ordered within tag list 1030 according to their relative relevance rating factor such that more relevant tags are presented at the top of the list. Tag information 1032.B may convey consistency information about the tag. Consistency information 1032.B may comprise information relating to how consistently users have rated the relevancy of the tag (e.g., deviation in tag rating). For example, 1032.B may indicate that most users have rated the tag at the same relevancy level (e.g., the statistical model of the tag may have a low deviation). Alternatively, 1032.B may indicate that users have differed with respect to the tag's 1032 relevance (e.g., the statistical model of the tag may have a high deviation). This information may be conveyed using textually, numerically, through color, or the like.

In addition to rating tags 1030, a user may be allowed to enter a new tag at interface 1040. As such, interface 1040 may comprise a text entry. The new tag may be associated with content item 1015 and may be displayed in tag list 1030 for rating by other users.

Display 1002 may comprise user group list 1060. User group list 1060 may comprise users who rated a tag 1032, 1034, 1036, and/or 1038 (or tag associated with other content items) similarly. As discussed above, users who similarly rate tags 1030 may share a point-of-view, aesthetic preference, or the like. As such, the user may be interested in interacting with users 1062, 1064, and/or 1066. As discussed above, user list 1050 may further comprise users who similarly rated other content items and/or accessed similar content items. In another embodiment, user list 1060 may comprise a control to add one or more of users 1062, 1064, and/or 1066 to a user group. Selecting one of users 1062, 1064, and/or 1066 may provide access to content submitted by one or more of the users, tag relevancy ratings submitted by one or more of the users, content items accessed by one or more of the users, a web log (blog) maintained by one or more of the users, or the like.

Content list 1070 may comprise content submitted by users 1062, 1064 and/or 1066 having a similar set of tags and/or tag ratings to those at 1030. Like user list 1060, content list 1070 may comprise content items 1072, 1074 the user may wish to access given the user's previous access activity and/or tag ratings. For example, if the user has rated a particular location tag (e.g., "Skeena River") as highly relevant, one or more of content items 1072, 1074 may comprise content having the same and/or a similar tag.

The above description provides numerous specific details for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps or by a combination of hardware, software, and/or firmware.

Embodiments may also be provided as a computer program product including a computer-readable medium having stored thereon instructions that may be used to program a computer (or other electronic device) to perform processes described herein. The computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

As used herein, a software module or component may include any type of computer instruction or computer executable code located within a memory device and/or transmitted as electronic signals over a system bus or wired or wireless network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be understood by those having skill in the art that many changes may be made to the details of the above-described embodiments without departing from the underlying principles of the invention. The scope of the present invention should, therefore, be determined only by the following claims.

We claim:

1. A non-transitory computer-readable storage medium comprising program code for causing a computer to perform a method for creating a user community consensus of the relevance of a metadata tag to a content item, the method comprising:

receiving a metadata tag submitted by a first user of the user community the metadata tag describing an associated content item;

receiving a plurality of relevance ratings of the metadata tag submitted by the first user from other users of the user community, the metadata tag relevance ratings each rating the relevance of the metadata tag as pertaining to the associated content item, each user having a respective rating weight that determines the weight afforded to ratings of the user relative to other users in the user community;

weighting the relevance ratings submitted by the users relative to one another based on the respective rating weights of the users;

calculating an average relevance rating of the metadata tag using the weighted relevance ratings; and storing the relevance ratings and the average relevance rating of the metadata tag.

2. The non-transitory computer-readable storage medium of claim 1, the method further comprising:

assigning a rating weight to the first user based on relevance ratings of metadata tags submitted by the first user received from the other users of the user community; and calculating an average relevance rating of a first metadata tag rated by the first user using the rating weight assigned to the first user.

3. The non-transitory computer-readable storage medium of claim 1, the method further comprising:

calculating a respective consistency level of relevance ratings of each of a plurality of metadata tags submitted by users in the user community; and identifying controversial metadata tags using the consistency levels of the relevance ratings of the metadata tags.

4. The non-transitory computer-readable storage medium of claim 3, wherein calculating the consistency level comprises calculating a deviation of the plurality of relevance ratings of the particular metadata tag.

5. The non-transitory computer-readable storage medium of claim 1, the method further comprising:

calculating a respective consistency level of relevance ratings of each of a plurality of metadata tags submitted by users in the user community; and providing a user interface to display a particular one of the metadata tags, the content item associated with the particular metadata tag, and an indicator of the consistency level of the relevance ratings of the particular metadata tag.

6. The non-transitory computer-readable storage medium of claim 1, the method further comprising:

associating each of a plurality of metadata tag relevance ratings submitted by users in the user community with respective user accounts of the users;

identifying two or more users having a similar aesthetic taste based on the metadata tag relevance ratings associated with the user accounts of the two or more users; and adding user accounts of the two or more identified users to a first user group.

7. The non-transitory computer-readable storage medium of claim 6, the method further comprising adding one or more user accounts to a second user group based on the respective users rating metadata tags associated with similar content items.

8. The non-transitory computer-readable storage medium of claim 1, the method further comprising:

calculating a respective consistency level of relevance ratings of each of a plurality of metadata tags submitted by users in the user community; and ordering a search result comprising a plurality of content items based on a relevance rating consistency level of one or more metadata tags assigned to the content items in the search result.

9. The non-transitory computer-readable storage medium of claim 1, wherein the content item comprises an image.

10. The non-transitory computer-readable storage medium of claim 1, wherein the content item comprises multimedia content.

* * * * *